(12) United States Patent
Sigtermans et al.

(10) Patent No.: US 7,768,530 B2
(45) Date of Patent: Aug. 3, 2010

(54) VERIFICATION OF PROCESS VARIABLE TRANSMITTER

(75) Inventors: Walter H. Sigtermans, Apple Valley, MN (US); Patrick M. Dobrowski, Burnsville, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 638 days.

(21) Appl. No.: 11/698,306

(22) Filed: Jan. 25, 2007

(65) Prior Publication Data

US 2008/0180276 A1 Jul. 31, 2008

(51) Int. Cl.
*G09G 5/00* (2006.01)
*G08C 19/00* (2006.01)
*G08C 19/16* (2006.01)
*G06F 19/00* (2006.01)
*E21B 47/10* (2006.01)
*E21B 47/06* (2006.01)
*B60W 10/10* (2006.01)
*F16H 61/662* (2006.01)

(52) U.S. Cl. .............. 345/619; 340/870.1; 340/870.03; 340/870.3; 702/1; 702/50; 702/100; 477/34; 477/45; 73/152.18; 73/152.51; 73/61.47; 137/1

(58) Field of Classification Search ................. 340/870.01–870.07, 870.42; 345/619, 586, 345/606, 548, 501, 520, 689, 156; 700/1, 700/30, 67; 702/1, 33, 50, 45–47, 82, 90, 702/98–100, 127, 130; 477/34, 37, 45, 78, 477/95, 156; 73/1.35, 61.47, 152.18, 152.51; 137/1–2, 814, 100, 477; 707/1, 100, 200; 715/200, 700

See application file for complete search history.

(56) References Cited

U.S. PATENT DOCUMENTS

| 5,488,561 | A | * | 1/1996 | Berkowitz et al. | ............. 700/45 |
| 5,818,714 | A | * | 10/1998 | Zou et al. | ..................... 700/37 |
| 6,567,928 | B1 | * | 5/2003 | Lyle et al. | ..................... 714/15 |
| 6,643,610 | B1 | * | 11/2003 | Kleven et al. | ............... 702/183 |
| 2004/0024568 | A1 | * | 2/2004 | Eryurek et al. | ............. 702/182 |
| 2005/0258959 | A1 | * | 11/2005 | Schnaare et al. | ....... 340/539.26 |
| 2005/0274417 | A1 | * | 12/2005 | Perry et al. | .............. 137/487.5 |

(Continued)

FOREIGN PATENT DOCUMENTS

DE    10120235    4/2001

(Continued)

OTHER PUBLICATIONS

"Notification of Transmittal of the International Search Report and The Written Opinion of the International Searching Authority, or the Declaration" for PCT/US2008/000702 filed Jan. 18, 2008; 11 pages.

(Continued)

*Primary Examiner*—Wesner Sajous
(74) *Attorney, Agent, or Firm*—Westman, Champlin & Kelly, P.A.

(57) ABSTRACT

A method and apparatus for verifying operation of process variable transmitters in process control or monitoring systems is provided. A process variable is measured with a process variable transmitter to verify operation of the process variable transmitter by comparing the process variable with a reference. A data entry is placed in a database which indicates operation of the process variable transmitter has been verified.

24 Claims, 13 Drawing Sheets

U.S. PATENT DOCUMENTS

| | | | |
|---|---|---|---|
| 2006/0020626 A1* | 1/2006 | Berwanger | 707/104.1 |
| 2006/0100807 A1* | 5/2006 | Koukol et al. | 702/88 |
| 2006/0144932 A1* | 7/2006 | Bendeck et al. | 235/383 |
| 2007/0112905 A1* | 5/2007 | Blevins et al. | 708/833 |
| 2007/0193369 A1* | 8/2007 | Evans et al. | 73/861.52 |
| 2008/0082180 A1* | 4/2008 | Blevins et al. | 700/29 |
| 2008/0161958 A1* | 7/2008 | Davidson et al. | 700/109 |
| 2009/0265376 A1* | 10/2009 | Hamdy et al. | 707/102 |

OTHER PUBLICATIONS

Communication for related European patent application No. 08724629.4-1236 mailed Dec. 23, 2009; 3 pages.

* cited by examiner 3.4.3 Meter Under Test Page

```
Test Data Entry - Meter Under Test- FT - 101                    [?][X]

Meter Under Test          ─ 302
    ┌─ Identification ───────────────────────────────────┐
    │   AMS Tag  FT-101                                  │
    │     Device: [MicroMotion 9739 FT - 101         ]   │
    │     Area:   [Area: Unit, Equipment Module, Control Module FT - 101] │
    └────────────────────────────────────────────────────┘

┌─ Configuration ────304──────────────────────────────┐
    │   Totalizer Units:          Pulse Factor: [      ]  │
    │   [lb           ▼]          Pulse Factor Units: [▼] │
    └────────────────────────────────────────────────────┘

[< Back] [ Next > ] [ Cancel ] [ Help ]
```

FIG. 3

3.4.4 Test Equipment Page

```
Test Data Entry - Equipment - FT - 101                          [?][X]

Please select up to four items of test equipment used to during this calibration. It is
important that the serial numbers are correct. If a piece of test equipment that you
used is not in the list, choose the Add Test Equipment button to define it...    ─ 402

Item 1  [TEQ-101: Fluke VOM TEQ-101        ▽]  [Browse...]
    Item 2  [Not used                          ▽]  [Browse...]
    Item 3  [Not used                          ▽]  [Browse...]
    Item 4  [Not used                          ▽]  [Browse...]

[ Add Test Equipment ]

[< Back]  [Next >]  [Cancel]  [Help]
```

FIG. 4

3.4.6 Test Fluid Page

```
Test Data Entry - Test Fluid Information - FT - 101                    [?][X]

Test Fluid                 602
    [water        ▽]

Density of Test Fluid
    [8      ] [lb/gal    ▽]

The density of the Test Fluid must already be
    corrected for temperature and pressure.
                                          604
    ┌─Conditions of the Test Fluid──────────────────┐
    │ Temperature:              Pressure:           │
    │ [68  ] [degF  ▽]          [15  ] [psi   ▽]    │
    └───────────────────────────────────────────────┘

[ <Back ] [ Next> ] [ Cancel ] [ Help ]
```

| Test Data Entry - Enter Data - FT - 101 | | | | | | ? X |
|---|---|---|---|---|---|---|
| Run/Rate (gal/min) | MUT Start (lb.) | MUT End (lb.) | Ref Start (pulses) | Ref End (pulses) | Actual (gal/min) | |
| 1 @ 12.00 | 0.00 | 99.95 | 0.00 | 6000.00 | 12.00 | |
| 2 @ 12.00 | 0.00 | 99.97 | 0.00 | 6000.00 | 12.00 | |
| 3 @ 12.00 | 0.00 | 99.96 | 0.00 | 6000.00 | 12.00 | |
| 1 @ 12.00 | 0.00 | 100.01 | 0.00 | 6000.00 | 24.00 | |
| 2 @ 24.00 | 0.00 | 99.99 | 0.00 | 6000.00 | 24.00 | 702 |
| 3 @ 24.00 | 0.00 | 100.00 | 0.00 | 6000.00 | 24.00 | |
| 1 @ 36.00 | 0.00 | 100.03 | 0.00 | 6000.00 | 36.00 | |
| 2 @ 36.00 | 0.00 | 100.04 | 0.00 | 6000.00 | 36.00 | |
| 3 @ 36.00 | 0.00 | 100.03 | 0.00 | 6000.00 | 36.00 | |

Setup/Safety Instructions
Zero the totalizer before starting

Reset the totalizer between each run.
Cleanup Instructions
1. Verify the density recorded on the 9739.
2. Run a 4 mA loop test and verify that LRV is recorded at the Control System.
3. Run a 20mA loop test and verify that LRV is recorded at the Control System.

[ < Back ]  [ Next > ]  [ Cancel ]  [ Help ]

FIG. 7

3.4.10 View Results Page

Test Data Entry - Results - FT - 101   [?][X]

Gravimetric Meter Under Test with Gravimetric Reference
Test Fluid Density 8.0000 lb/gal

| Run/Rate (gal/min) | MUT Delta (lb.) | Ref Delta (lb.) | Actual Rate (gal/min) | % Error |
|---|---|---|---|---|
| 1 @ 12.00 | 99.95 | 100.00 | 12.00 | -0.05 |
| 2 @ 12.00 | 99.97 | 100.00 | 12.00 | -0.03 |
| 3 @ 12.00 | 99.96 | 100.00 | 12.00 | -0.04 |
| 1 @ 24.00 | 100.01 | 100.00 | 12.00 | 0.01 |
| 2 @ 24.00 | 99.99 | 100.00 | 12.00 | -0.01 |

Meter Factor (MF) 1,0000

| Name | Limit % | Actual % | Result |
|---|---|---|---|
| Maximum Error | 0.5000 | -0.0500 | Pass |
| Repeatability | N/A | 0.0900 | N/A |
| Loop Test | 0.2500 | 0.0000 | Pass |

| Point | Expected (gal/min) | Actual (gal/min) | % Error | Result |
|---|---|---|---|---|
| 1 | 12.0000 | 12.0000 | 0.0000 | Pass |
| 2 | 36.0000 | 36.0000 | 0.0000 | Pass |

Calibration Status: Pass
Next Calibrations Due: 3/15/2005

< Back    Next >    Cancel    Help

FIG. 8

3.4.11 Enter Service Notes Page

```
┌─────────────────────────────────────────────────────────────┐
│ Test Data Entry - Service Notes, FT - 101            ? X   │
│                                                              │
│   Enter Services Notes for this Verification                │
│   ┌────────────────────────────────────────────────────┐   │
│   │ Ran 2 minute runs                                   │   │
│   │                                                      │   │
│   │                                         902          │   │
│   │                                         ———          │   │
│   │                                                      │   │
│   │                                                      │   │
│   └────────────────────────────────────────────────────┘   │
│                                                              │
│                      [< Back] [Next >] [Cancel] [Help]      │
└─────────────────────────────────────────────────────────────┘
```
← 900

FIG. 9

Test Data Entry - Flow Rate 1 Run 1 - FT - 305

Meter Under Test
- Starting Totalizer Value: 5.000000 kg
- Ending Totalizer Value: 25.000000 kg Flow Rate
- Target: 10.00 kg/min
- Actual: 10.00 kg/min Reference Meter
- Starting Totalizer Value: 15.000000 kg
- Ending Totalizer Value: 35.000000 kg Read Start
Read End Setup/Safety Instructions
Remember to reset the totalizer between each run
Cleanup Instructions < Back | Next > | Cancel | Help

FIG. 11

| Date | Time | User | Event Type | Reason |
|---|---|---|---|---|
| 07/26/06 | 11:24:20 AM | PA.USRTC-WALTSIG | Device Synchroniz... | Device/database synchronization successful with no differences found in TRANSDUCER1 |
| 07/26/06 | 11:24:20 AM | PA.USRTC-WALTSIG | Device Synchroniz... | Device/database synchronization successful with no differences found in TRANSDUCER900 |
| 07/26/06 | 11:24:20 AM | PA.USRTC-WALTSIG | Device Synchroniz... | Device/database synchronization successful with no differences found in TRANSDUCER800 |
| 07/26/06 | 11:24:20 AM | PA.USRTC-WALTSIG | Device Synchroniz... | Device/database synchronization successful with no differences found in TRANSDUCER500 |
| 07/26/06 | 11:24:20 AM | PA.USRTC-WALTSIG | Device Synchroniz... | Device/database synchronization successful with no differences found in TRANSDUCER700 |
| 07/26/06 | 11:24:19 AM | PA.USRTC-WALTSIG | Device Synchroniz... | Device/database synchronization successful with no differences found in TRANSDUCER600 |
| 07/26/06 | 11:24:19 AM | PA.USRTC-WALTSIG | Device Synchroniz... | Device/database synchronization successful with no differences found in TRANSDUCER400 |
| 07/26/06 | 11:24:18 AM | PA.USRTC-WALTSIG | Device Synchroniz... | Device/database synchronization successful with no differences found in RESOURCE |
| 07/26/06 | 11:20:56 AM | WALTER | Calibration | Device Verification Password |
| 07/26/06 | 11:17:53 AM | PS.USRTC-WALTSIG | Device Synchroniz... | Device/database synchronization successful with no differences found in TRANSDUCER400 |
| 07/26/06 | 11:17:15 AM | PS.USRTC-WALTSIG | Device Synchroniz... | Device/database synchronization successful with no differences found in RESOURCE |
| 07/26/06 | 11:15:36 AM | PS.USRTC-WALTSIG | Device Synchroniz... | Device/database synchronization successful with no differences found in TRANSDUCER400 |
| 07/26/06 | 11:13:21 AM | PS.USRTC-WALTSIG | Device Synchroniz... | Device/database synchronization successful with no differences found in TRANSDUCER400 |
| 06/09/06 | 10:27:26 AM | PS.USRTC-WALTSIG | Device Synchroniz... | Device/database synchronization successful with no differences found in RESOURCE |
| 06/09/06 | 10:27:23 AM | PS.USRTC-WALTSIG | Device Synchroniz... | Device/database synchronization successful with no differences found in TRANSDUCER400 |
| 06/09/06 | 10:27:23 AM | PS.USRTC-WALTSIG | Device Synchroniz... | Device/database synchronization successful with no differences found in TRANSDUCER400 |
| 06/08/06 | 10:24:39 AM | PS.USRTC-WALTSIG | Device Synchroniz... | Device/database synchronization successful with no differences found in TRANSDUCER400 |
| 06/08/06 | 10:24:39 AM | PS.USRTC-WALTSIG | Device Synchroniz... | Device/database synchronization successful with no differences found in TRANSDUCER400 |
| 06/08/06 | 10:24:39 AM | PS.USRTC-WALTSIG | Device Synchroniz... | Device/database synchronization successful with no differences found in TRANSDUCER400 |
| 06/08/06 | 10:24:39 AM | PS.USRTC-WALTSIG | Device Synchroniz... | Device/database synchronization successful with no differences found in TRANSDUCER400 |
| 06/08/06 | 10:24:39 AM | PS.USRTC-WALTSIG | Device Synchroniz... | Device/database synchronization successful with no differences found in TRANSDUCER400 |
| 06/08/06 | 10:24:39 AM | PS.USRTC-WALTSIG | Device Synchroniz... | Device/database synchronization successful with no differences found in TRANSDUCER400 |
| 06/08/06 | 10:14:43 AM | WALTER | Calibration | Device Verification Passed |
| 06/08/06 | 09:57:58 AM | WALTER | Calibration | Routine Service |
| 06/08/06 | 09:35:32 AM | PS.USRTC-WALTSIG | Device Synchroniz... | Device/database synchronization successful with no differences found in TRANSDUCER400 |
| 06/08/06 | 09:35:17 AM | PS.USRTC-WALTSIG | Device Synchroniz... | Device/database synchronization successful with no differences found in TRANSDUCER400 |
| 06/08/06 | 09:35:00 AM | PS.USRTC-WALTSIG | Device Synchroniz... | Device/database synchronization successful with no differences found in TRANSDUCER400 |
| 06/08/06 | 09:35:00 AM | PS.USRTC-WALTSIG | Device Synchroniz... | Device/database synchronization successful with no differences found in TRANSDUCER400 |
| 06/08/06 | 09:35:00 AM | PS.USRTC-WALTSIG | Device Synchroniz... | Device/database synchronization successful with no differences found in TRANSDUCER400 |
| 06/08/06 | 09:35:00 AM | PS.USRTC-WALTSIG | Device Synchroniz... | Device/database synchronization successful with no differences found in TRANSDUCER400 |
| 06/08/06 | 09:34:50 AM | PS.USRTC-WALTSIG | Device Synchroniz... | Device/database synchronization successful with no differences found in TRANSDUCER400 |
| 06/08/06 | 09:34:50 AM | PS.USRTC-WALTSIG | Device Synchroniz... | Device/database synchronization successful with no differences found in TRANSDUCER400 |
| 06/08/06 | 09:34:49 AM | PS.USRTC-WALTSIG | Device Synchroniz... | Device/database synchronization successful with no differences found in TRANSDUCER400 |
| 06/08/06 | 09:34:38 AM | PS.USRTC-WALTSIG | Device Synchroniz... | Device/database synchronization successful with no differences found in TRANSDUCER400 |
| 06/08/06 | 09:34:33 AM | PS.USRTC-WALTSIG | Device Synchroniz... | Device/database synchronization successful with no differences found in TRANSDUCER400 |
| 07/26/06 | 09:34:27 AM | WALTER | Calibration | AMS tag assignment |
| 007/26/06 | 09:34:27 AM | WALTER | Configuration Change | Renamed AMS tag 00031020000030EV0000004281 to FT-305 |

FIG. 13

VERIFICATION OF PROCESS VARIABLE TRANSMITTER

BACKGROUND OF THE INVENTION

The present invention relates to process variable transmitters of the type used to measure process variables in industrial processes. More specifically, the present invention relates to verification of operation of such process variable transmitters.

Process variable transmitters are used in industrial processes to measure process variables such as pressure, temperature, flow, etc. These measurements can be used to monitor operation of the industrial process. In some configurations, the industrial process is controlled based upon the measured process variables.

In some types of industrial processes, such as industrial processes which are subjected to regulations (for example, pharmaceutical or food manufacturing processes), there are regulations which require that proper operation of the process variable transmitters be periodically verified. For example, for a transmitter which measures flow of process fluid, an operator may periodically be required to place a known quantity of process fluid through the sensor of the flow transmitter and compare the output of the flow transmitter with the actual amount (known) amount of flow. The operator typically manually calculates the error and logs the data in a written log book.

Another example technique used to verify operation of a process variable transmitter is to compare the process variable output of the transmitter with the process variable output of a reference process variable transmitter. Again, the error must be manually calculated and manually recorded in a log book.

SUMMARY OF THE INVENTION

A method and apparatus for verifying operation of process variable transmitters in process control or monitoring systems is provided. A process variable is measured with a process variable transmitter to verify operation of the process variable transmitter by comparing the process variable with a reference. A data entry is placed in a database which indicates operation of the process variable transmitter has been verified.

BRIEF DESCRIPTION OF THE DRAWINGS

FIG. 3 is a screen dump showing test data entry for a meter under test.

FIG. 4 is a screen dump showing test data entry equipment.

FIG. 6 is a screen dump showing test data entry test fluid information.

FIG. 7 is a screen dump showing a test data entry entered data entry table.

FIG. 8 is a screen dump showing test data entry results.

FIG. 9 is a screen dump showing entry of service notes.

FIG. 11 is a screen dump showing automated test data entry.

FIG. 13 is a screen dump showing an audit trail for a particular transmitter.

DETAILED DESCRIPTION OF ILLUSTRATIVE EMBODIMENTS

As discussed in the background section, certain industries such as the pharmaceutical and the food and beverage industry, require that operation of process variable transmitter be periodically verified. This verification is used to insure that the process variable transmitter is working within specifications. For example, a "bucket test" can be used to verify that a flow transmitter is working properly. In a bucket test, an operator compares a known quantity of material (i.e. a "bucket" full of water) with a total value measured by a process variable transmitter. The present invention provides a technique for assisting the operator in obtaining verification information, in maintaining the verification information in a database. This allows the verification information to be subsequently retrieved and traced to a particular transmitter. This provides evidence that the transmitter was verified as properly working at a particular time.

Figure 1:
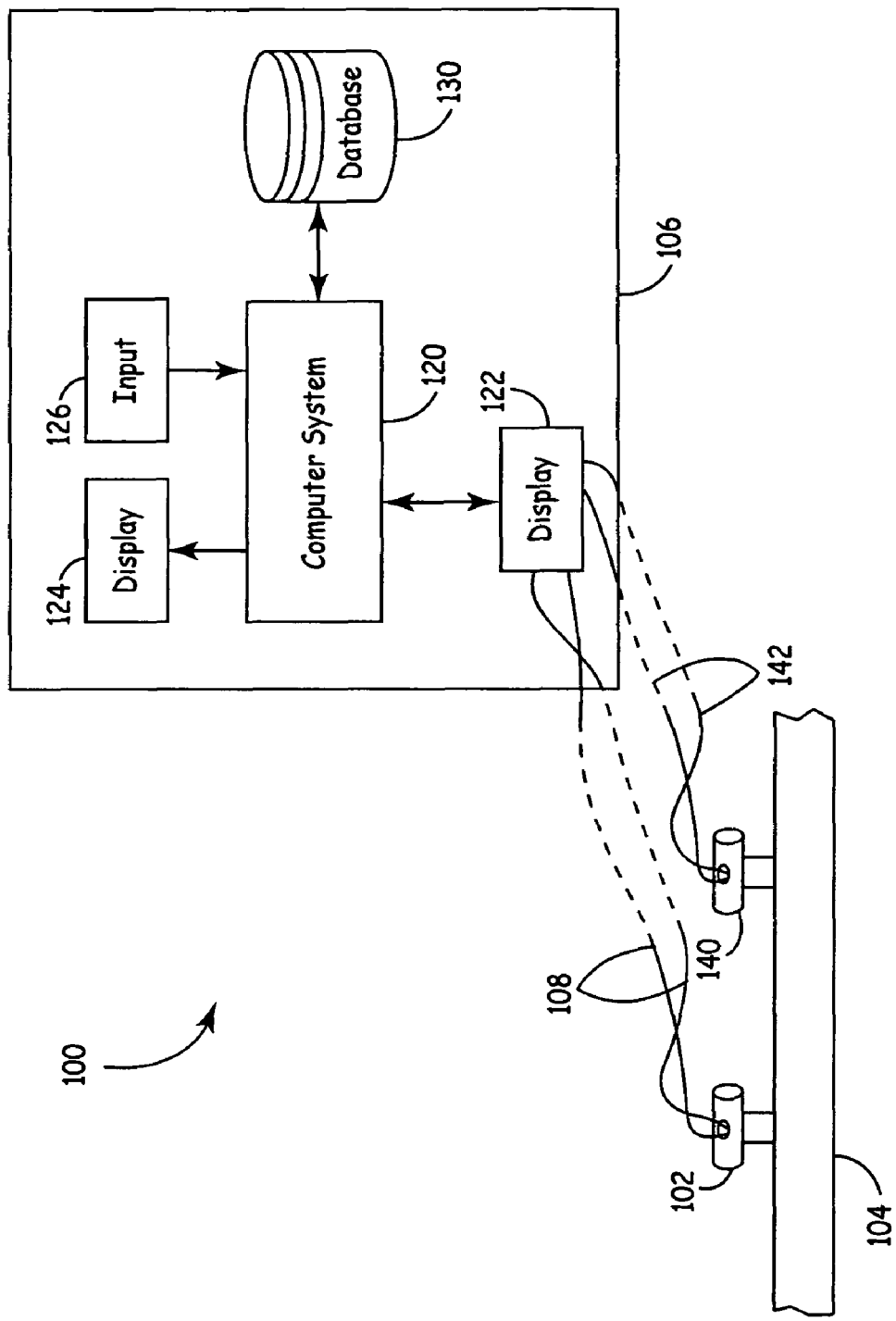
FIG. 1 is a simplified block diagram showing an industrial process control system including a process variable transmitter which can be verified in accordance with the present invention.

FIG. 1 is a simplified block diagram of an industrial process control or monitoring system 100 including a process variable transmitter 102 coupled to an industrial process through process piping 104. Process variable transmitter 102 couples to a centralized location such as a control room 106 over a two-wire process control loop 108. Two-wire process control loop can be any type of process control loop. Example process control loops include those operating in accordance with the HART® communication standard, FieldBus communication standard, the ProfiBus standard, or others. Some configurations allow only a single transmitter to be coupled to the process control loop, while other process control loops can be coupled to multiple transmitters. In some configurations, the process control loop is also used to completely power the process variable transmitter. The process control loop may employ various wireless techniques as well.

Control room 106 includes computer system 120 which couples to input/output circuitry 122 communication with transmitter 102. Computer system 120 also connects to user inputs and outputs, for example, a display 124 and an input 126, such as a keyboard, mouse or the like. A database 130 couples to computer system 120 and can be stored, for example, on a local or remote permanent storage device. The database 130 can be in any appropriate format, for example, in accordance with known SQL (Structured Query Language) techniques.

As explained in greater detail, during operation, computer system 120 can be used to verify the accurate operation of process variable transmitter 102.

Figure 2:
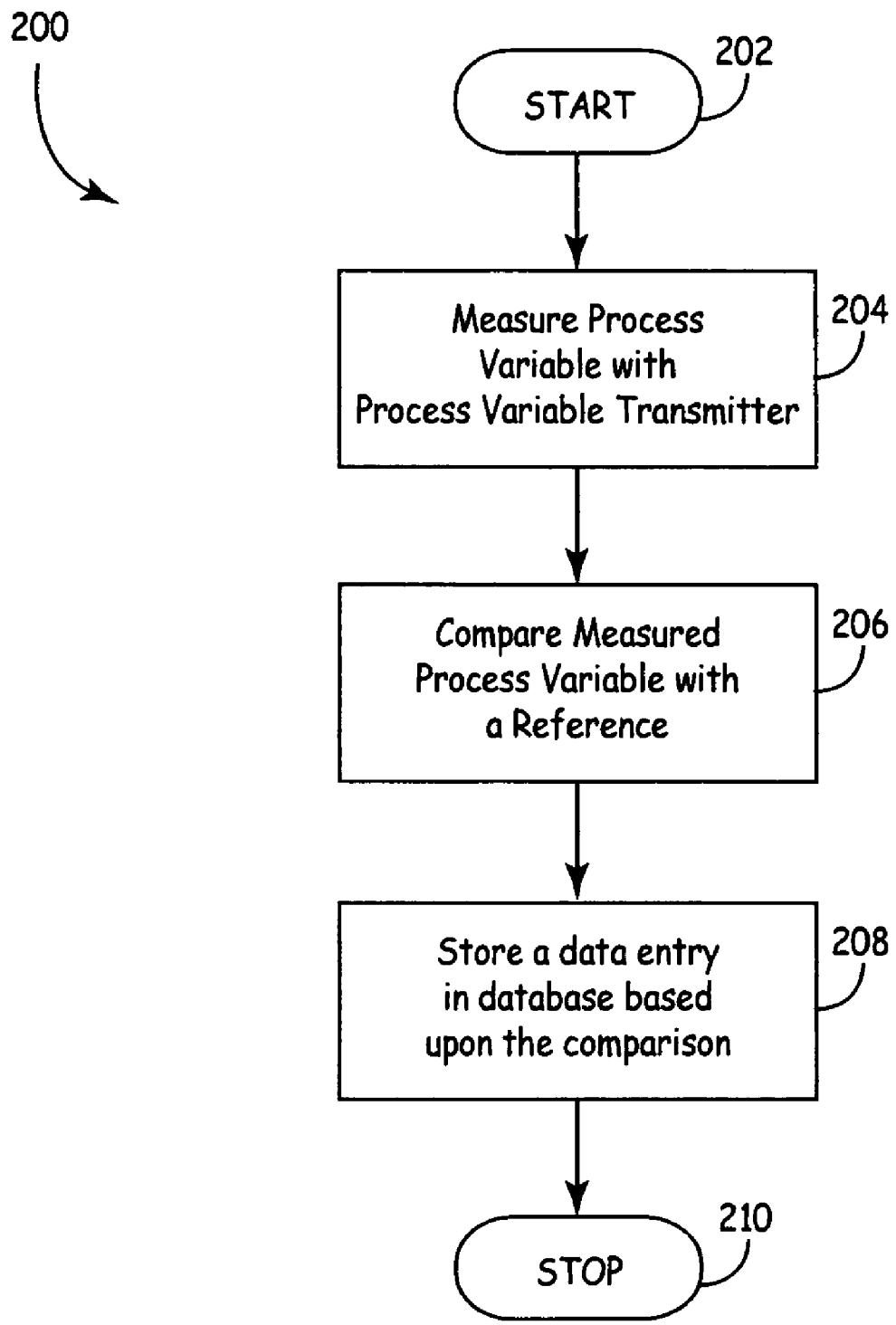
FIG. 2 is a simplified block diagram showing steps in accordance with the present invention.

FIG. 2 is flow chart 200 showing steps in accordance with the present invention. At block 202, the process starts and at block 204, a process variable is measured using process variable transmitter 102. At block 206, the measured process variable is compared with a reference. At block 208, a data entry is stored in database 130 shown in FIG. 1 based upon the step of comparing at block 206. At block 210 the process is terminated.

The steps shown in FIG. 2, can be performed by computer system 120 shown in FIG. 1 and can be, for example, initiated using user input 126. The computer system shown in FIG. 1 can be implemented at a central location, remote location, portable device, or in another configuration. The process variable from the process variable transmitter 102 is received over process control loop 108 by using input/output circuitry 102. The reference used in block 206 of FIG. 2 can be determined using a manual technique, for example, by providing a known flow quantity and comparing it with a total flow output from transmitter 102. In such a configuration, the reference value can be input on input 126 and computer system 120 performs the comparison at block 208 of comparing the reference input with the process variable provided by transmitter 102.

In another example configuration, the reference 206 is provided from a reference variable transmitter such as transmitter 140 shown in FIG. 1. Loops 108 and 142 can be separate loops as illustrated in FIG. 1, or can comprise a single pair of wires. In such a configuration, the reference value does not need to be input using input 126.

The above configurations can eliminate the requirement for manual documentation, as well as the introduction of errors when the verification is manually calculated. These processes are now automated thereby reducing the likelihood of human error. Further, the ability to enter, save and recall verification information provides traceability to verification procedures used in some industries such as the pharmaceutical and food and beverage production industries.

Figure 5:
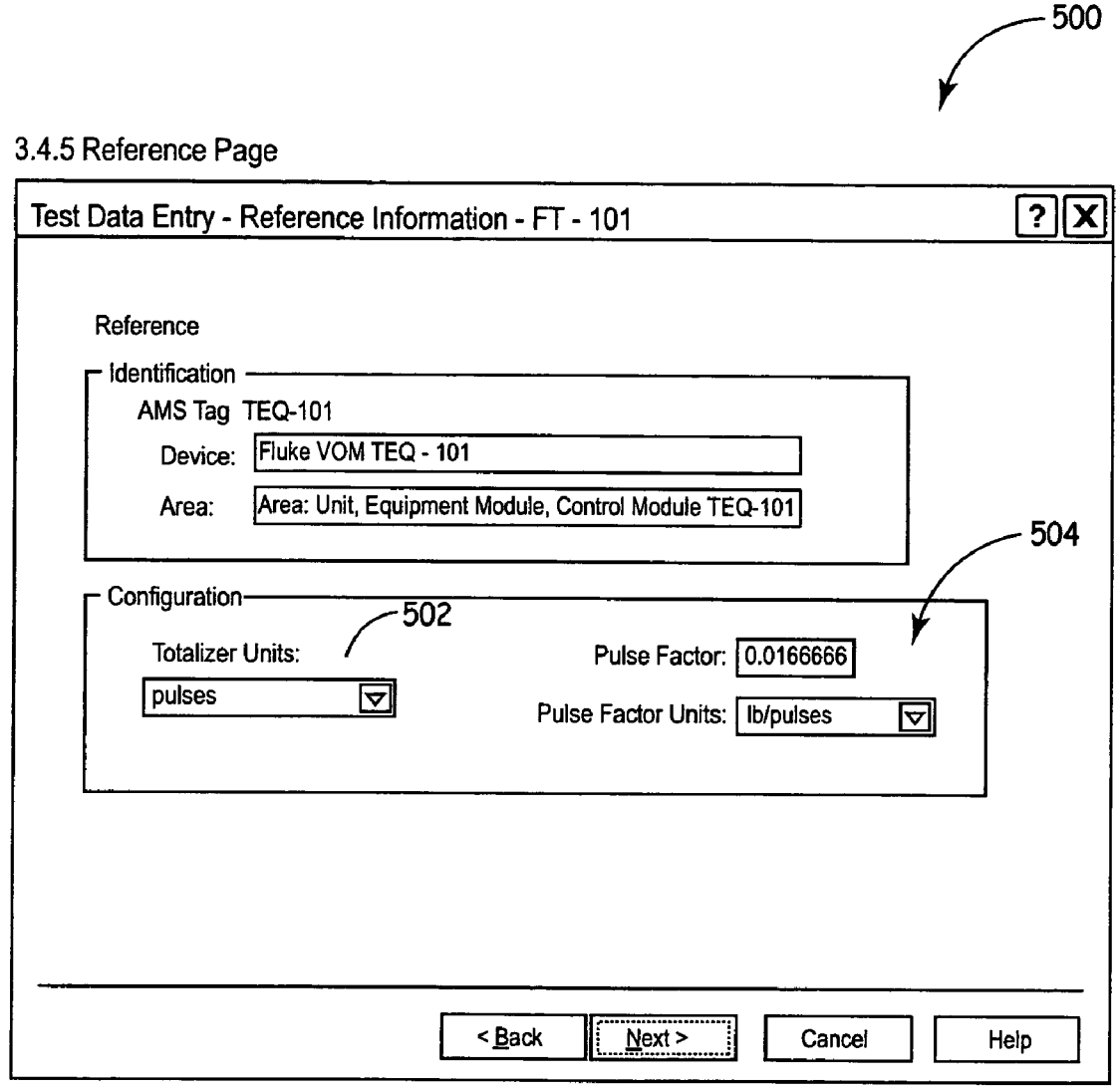
FIG. 5 is a screen dump showing test data entry reference information.

Entry of data into the computer system 120 can be through a graphical user interface displayed on display 124 and controlled through input 126. For example, FIG. 3 shows a screen dump 300 for use in manually inputting verification data. In FIG. 3, the particular transmitter is identified in identification field 302. The particular units for the transmitter can be selected in field 304. In FIG. 4, which is screen dump 400, the particular type of test equipment can be input at field 402. In the example of FIG. 4, the test equipment is a particular type of volt meter. In screen dump 500, as illustrated in FIG. 5, information regarding the reference is input which was selected in the user input shown in FIG. 4 can be provided. In particular, FIG. 5 provides for the selection of the particular units in field 502. If the units are, for example, pulses, field 504 can be used to provide the relationship between a number of pulses and the reference process variable.

In the screen dump 600 of FIG. 6, information can be entered regarding the test fluid. In this example, the test fluid comprises water which is entered in the field at 602. The particular conditions (temperature and pressure) of the test fluid can be entered at 604. This information is used in determining the reference used in step 206 shown in FIG. 2.

The screen dump 700 shown in FIG. 7 is for use in entering the reference information. In the example of FIG. 7, there are inputs for three sets of test runs at different process variable levels, i.e. different flow rates. The process variable is read by the meter under test (MUT) can be entered into the table 702 of FIG. 7, or can be communicated over the two-wire process control loop 108 shown in FIG. 1. The process variable values in this particular test are the total amount of flow over a particular period. The table 702 also includes fields for entering the process variable reference, in this case pulses, along with the actual reference process variable, in this case gallons per minute.

FIG. 8 shows a screen dump 800 which illustrates the results of the test data entry. Based on the data entered in FIG. 7, the actual output of the meter under test as compared with the reference value and a percent error is output in column 802. In table 804, the actual error is compared with an acceptable limit for the transmitter. If the transmitter is outside of the acceptable limit range, the unit will not pass that particular verification test.

Figure 10:
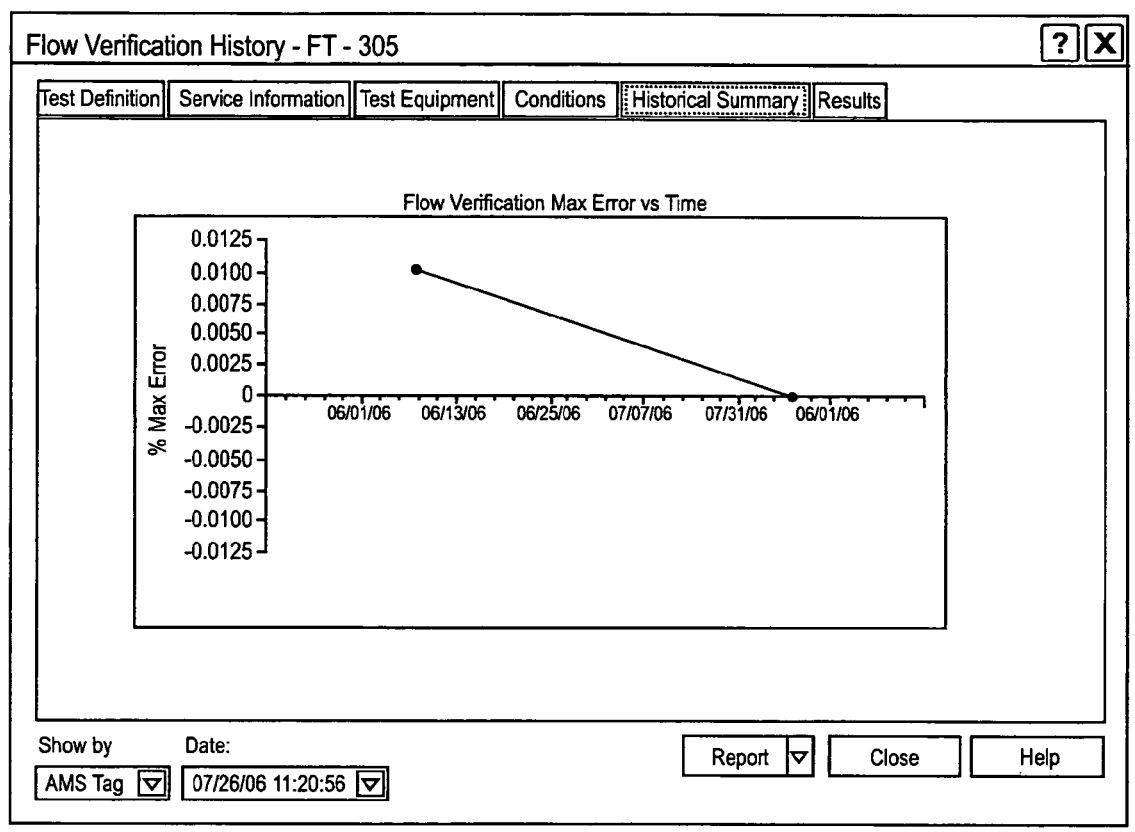
FIG. 10 is a screen dump showing flow verification error versus time.

FIG. 9 is a screen dump 900 showing a field 902 for entry of service notes related to the verification process. The service notes can be stored in the database as discussed above for later recovery. Once the data is collected, it can be saved for future reference. For example, FIG. 10 is a graph showing maximum error versus time for a particular flow meter collected over a period of time.

Although not illustrated, additional outputs can include, for example, information related to verification data versus time, for example in the form of a graph or the like.

FIG. 11 is a screen dump 1100 in which values from a meter under test and a reference meter are displayed. Although data from a reference meter, such as transmitter 140 shown in FIG. 1, can be retrieved over a process control loop, such as process control loop 142. This reference meter can be used to verify operation of the meter under test, for example, by providing a pass/fail indication as illustrated with respect to FIG. 8.

Figure 12:
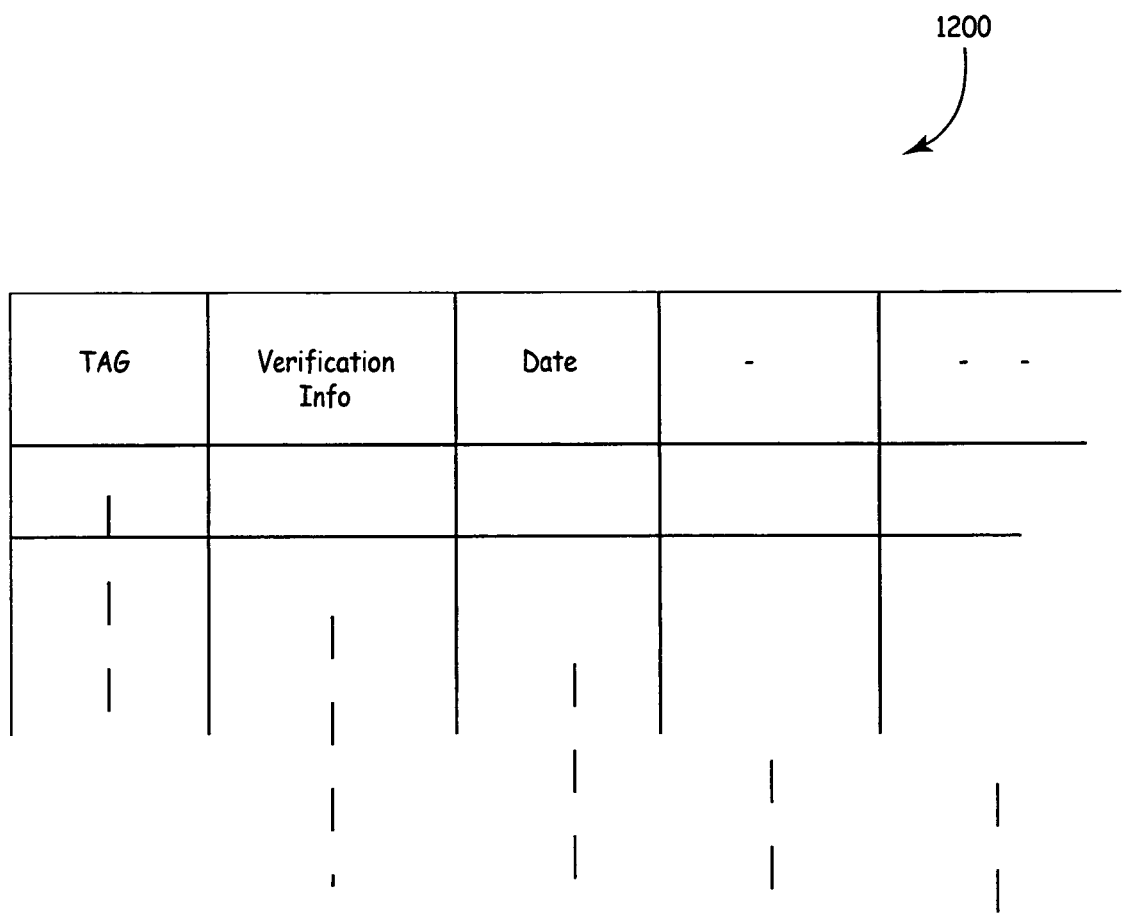
FIG. 12 is a screen dump showing configuration of example database.

Once the verification data has been determined, it is stored in database 130. Database 130 can be a local database, or it can be located a remote location. FIG. 12 is a simplified diagram of such a database 1200 in which a TAG entry is used to identify a particular process variable transmitter. A database entry also includes verification information, for example, pass/fail information and/or particular values generated during verification. Other example entries include the date of the verification, information identifying the operator who verified the information, the location of the transmitter under test, the position or orientation of the test, or any other relevant or desired information. In one configuration, the stored database is secured in a manner to prevent tampering. This allows the data to be subsequently recovered and used as proof that the operation of a particular transmitter has been verified. For example, FIG. 13 is a screen dump showing an audit trail for a particular transmitter (identified as ftFT305) showing the date and time of verification, the user, the particular event and the result of reason of the test.

Although the above description is directed to verification of a process variable transmitter which measures flow, any type of process variable transmitter can be verified. Other examples include temperature, level, pressure, etc.

Although the present invention has been described with reference to preferred embodiments, workers skilled in the art will recognize that changes may be made in form and detail without departing from the spirit and scope of the invention. In another example configuration, the test data entry equipment illustrated in FIG. 4 can be another transmitter, for example, a reference transmitter.

What is claimed is:

1. A method for verifying operation of process variable transmitters in process control or monitoring systems, comprising:
    measuring a process variable with a process variable transmitter and provides a measured process variable output;
    verifying operation of the process variable transmitter by comparing the measured process variable output with a reference;
    using a computer system to receive the measured process variable output and the reference and responsively place a data entry in a database indicating operation of the process variable transmitter has been verified based upon the step of verifying; and
    recovering the data entry to allow the indicated and verified operation to be subsequently retrieved and traced to a particular transmitter.

2. The method of claim 1 wherein the reference comprises an output from another process variable transmitter.

3. The method of claim 1 wherein the step of verifying includes providing a pass/fail determination.

4. The method of claim 1 wherein the reference comprises a known process variable value.

5. The method of claim 1 including receiving information related to the reference over a process control loop.

6. The method of claim 1 including transmitting the measured process variable output over a process control loop.

7. The method of claim 1 including receiving a user input which identifies the process variable transmitter.

8. The method of claim 1 including receiving a user input which identifies the process variable.

9. The apparatus of claim 8 wherein the input comprises units.

10. The method of claim 1 including receiving information from a user related to the reference.

11. The method of claim 10 wherein the information comprises units of the reference.

12. The method of claim 1 including receiving information from a user which relates the process variable to the reference.

13. The method of claim 1 including receiving information from a user related to a test fluid.

14. The method of claim 1 wherein the data entry includes information which identifies the process variable transmitter.

15. The method of claim 1 wherein the data entry includes information related to a date of the step of verification.

16. The method of claim 1 including securing the date entry to prevent tampering.

17. The method of claim 1 including proving the step of verifying was performed based upon the step of recovering.

18. The method of claim 1 wherein the step of verifying includes calculation of percent error of the process variable transmitter.

19. The method of claim 18 including placing the calculated percentage in the database.

20. A computer system including software configured to implement the method of claim 1.

21. The apparatus of claim 20 wherein the computer system couples to a two wire process control loop.

22. The apparatus of claim 20 wherein the computer system includes a user input.

23. The apparatus of claim 20 wherein the computer system includes a display.

24. The apparatus of claim 20 wherein the computer system includes a memory for storing the database.

\* \* \* \* \*